(12) United States Patent
Jung et al.

(10) Patent No.: US 8,405,616 B2
(45) Date of Patent: Mar. 26, 2013

(54) METHOD OF USING A TOUCH SCREEN AND USER INTERFACE APPARATUS EMPLOYING THE SAME

(75) Inventors: Jung-woon Jung, Suwon-si (KR); Jeong-rae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 893 days.

(21) Appl. No.: 11/509,608

(22) Filed: Aug. 25, 2006

(65) Prior Publication Data
US 2007/0097092 A1 May 3, 2007

(30) Foreign Application Priority Data
Oct. 31, 2005 (KR) .................. 10-2005-0103424

(51) Int. Cl.
*G06F 3/041* (2006.01)

(52) U.S. Cl. ........ 345/173; 345/156; 345/168; 345/169; 345/172; 715/733; 715/750; 715/751; 715/761; 715/824

(58) Field of Classification Search .......... 345/156–173; 715/824, 733–761; 463/50
See application file for complete search history.

(56) References Cited

U.S. PATENT DOCUMENTS

| | | | |
|---|---|---|---|
| 5,594,471 A * | 1/1997 | Deeran et al. ................. | 345/173 |
| 5,715,380 A | 2/1998 | Lee | |
| 6,308,023 B1 * | 10/2001 | Nomura et al. ................. | 399/81 |
| 6,597,345 B2 * | 7/2003 | Hirshberg ..................... | 345/168 |
| 7,068,260 B2 * | 6/2006 | Hill ................................ | 345/173 |
| 2001/0028808 A1 * | 10/2001 | Nomura et al. ................. | 399/81 |
| 2004/0046784 A1 * | 3/2004 | Shen et al. .................... | 345/733 |
| 2006/0107235 A1 * | 5/2006 | Esaki et al. ................... | 715/824 |

FOREIGN PATENT DOCUMENTS

| | | |
|---|---|---|
| JP | 07-110742 | 4/1995 |
| JP | 2001-146065 | 5/2001 |
| JP | 2001-246819 | 9/2001 |
| KR | 1997-0012108 A | 3/1997 |
| KR | 2000-0000672 A | 1/2000 |
| KR | 1020050065994 A | 6/2005 |

* cited by examiner

*Primary Examiner* — William Boddie
*Assistant Examiner* — Saifeldin Elnafia
(74) *Attorney, Agent, or Firm* — Roylance, Abrams, Berdo & Goodman, LLP

(57) ABSTRACT

A user interface apparatus and method of using a touch screen are provided. The apparatus includes a touch screen division unit for dividing a screen area of the touch screen into zones, an allocation unit for allocating a user interface unit to each of the zones and a plurality of user interface units for sensing job commands input through the zones according to the allocation result of the allocation unit, wherein an operation corresponding to each of the sensed job commands is performed. Accordingly, since a plurality of users can simultaneously use an image-forming device by dividing the screen area of the touch screen into two or more zones, job processing time can be reduced, and a usage rate of a high specification image-forming device can be increased.

18 Claims, 3 Drawing Sheets

METHOD OF USING A TOUCH SCREEN AND USER INTERFACE APPARATUS EMPLOYING THE SAME

CROSS-REFERENCE TO RELATED PATENT APPLICATION

This application claims the benefit under U.S.C. §119(a) of Korean Patent Application No. 10-2005-0103424, filed on Oct. 31, 2005, in the Korean Intellectual Property Office, the entire disclosure of which is hereby incorporated by reference.

BACKGROUND OF THE INVENTION

1. Field of the Invention

The present invention relates to an image-forming device. More particularly, the instant invention relates to a user interface apparatus and method for allowing a plurality of users to simultaneously use an image-forming device having a touch screen.

2. Description of the Related Art

A touch screen is designed to execute a command or move a cursor by recognizing a contact point when a user touches the touch screen using a finger or a touch pen having a ball-point pen shape. The touch screen is a user interface method used in various fields, such as personal digital assistants (PDAs), liquid crystal displays (LCDs), cathode ray tubes (CRTs), banks, authorities, medical equipment, tourism, organization guides, and traffic guides.

In touch screen technology, a pressure sensing method and an electrostatic method may be used. The pressure sensing method is a method of calculating the coordinates of a pressurized location by installing sensors closely together that sense pressure exerted on the surface of the touch screen and sense the degree of pressure when the pressure is exerted. The pressure sensing method is widely used, but its accuracy is low. The electrostatic method has greater accuracy than the pressure sensing method. The electrostatic method calculates the coordinates of a touched location by charging the surface of the touch screen, installing sensors around the touch screen, and sensing the amount of charge lost when touching the touch screen.

Recently, medium or large sized image-forming devices, such as printers or multi-function peripherals (MFPs), generally use a touch screen as a user interface for users' convenience. In general, a plurality of users share such a medium or large sized image-forming device.

However, when operating an image-forming device using a touch screen, only a single user can use the touch screen at a given time. Thus, when a plurality of users want to use the image-forming device simultaneously, all but a certain user must wait to use the image-forming device until the certain user ends his/her work.

Accordingly, there is a need for an improved user interface apparatus and method of using a touch screen which allows a plurality of users to employ the touch screen at the same time.

SUMMARY OF THE INVENTION

Exemplary embodiments of the present invention address at least the above problems and/or disadvantages and provide at least the advantages described below. Accordingly, an aspect of the present invention is to provide a user interface apparatus and method of using a touch screen, which allows a plurality of users to simultaneously use the touch screen by dividing a screen area of the touch screen into two or more zones.

According to an aspect of the present invention, there is provided a user interface apparatus of a touch screen, the apparatus comprising a touch screen division unit for dividing a screen area of the touch screen, an allocation unit for allocating a user interface unit to each of the zones and a plurality of user interface units for sensing job commands input through the zones according to the allocation result of the allocation unit, wherein an operation corresponding to each of the sensed job commands is performed.

According to another aspect of the present invention, there is provided a user interface method of using a touch screen, the method comprising dividing a screen area of the touch screen into zones, allocating a user interface unit to each of the zones, sensing job commands input through the zones and performing an operation corresponding to each of the sensed job commands.

BRIEF DESCRIPTION OF THE DRAWINGS

The above and other features and advantages of the present invention will become more apparent by describing in detail exemplary embodiments thereof with reference to the attached drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention will now be described more fully with reference to the accompanying drawings, in which exemplary embodiments of the invention are shown.

Figure 1:
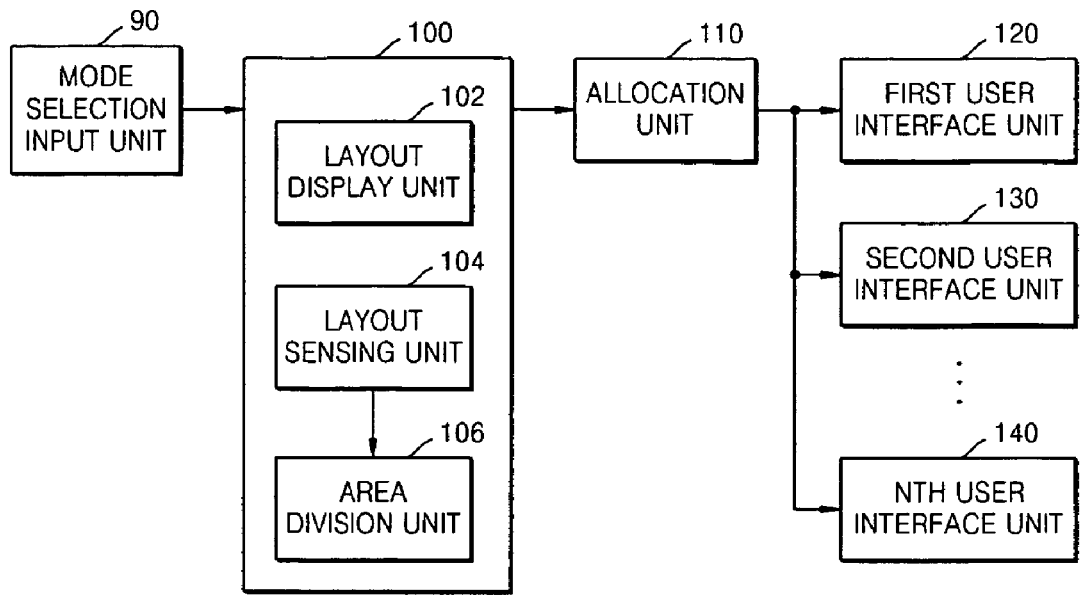
FIG. 1 is a block diagram of a user interface apparatus of a touch screen according to an exemplary embodiment of the present invention.

FIG. 1 is a block diagram of a user interface apparatus of a touch screen according to an exemplary embodiment of the present invention. The user interface apparatus includes a mode selection input unit 90, a touch screen division unit 100, an allocation unit 110, and first through nth (n is a positive integer larger than 1) user interface units 120 through 140.

Using the mode selection input unit 90, a user inputs a mode selection for dividing the screen area of the touch screen. The user selects a mode for area division of the touch screen so that the screen area is divided into at least two zones.

The mode selection input unit 90 may be an operating panel that senses a mode selection signal generated by a key panel operation of the user.

The mode selection input unit 90 can receive a mode selection signal when an image-forming device is in an idle state or is performing a job, such as printing or copying. That is, although a job of a certain user may be proceeding, the same user or another user can input a mode selection for area division of the touch screen through the mode selection input unit 90.

The touch screen division unit 100 divides the screen area of the touch screen into zones and outputs the division result to the allocation unit 110. To do this, the touch screen division unit 100 includes a layout display unit 102, a layout sensing unit 104, and an area division unit 106.

The layout display unit 102 displays sample layouts of the zones of the touch screen. Each of the sample layouts of the touch screen may be obtained by dividing the touch screen into at least two zones.

Figure 2A:
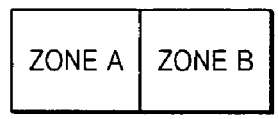
FIGS. 2A-D illustrate layouts for representing zones of a touch screen according to an exemplary embodiment of the present invention.
Figure 2B:
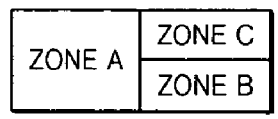
Figure 2C:
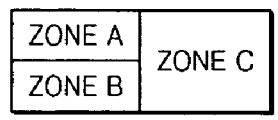
Figure 2D:
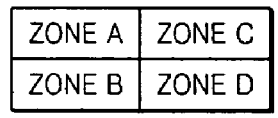

FIGS. 2A-D illustrate sample layouts for representing zones of the touch screen according to exemplary embodiments of the present invention. FIG. 2A is an example in which the touch screen is divided into two zones, FIG. 2B is an example in which the touch screen is divided into three zones, FIG. 2C is another example in which the touch screen is divided into three zones, and FIG. 2D is an example in which the touch screen is divided into four zones. However, FIGS. 2A-D show only examples of the ways the touch screen may be divided.

The layout sensing unit 104 senses a layout selected by the user among the displayed layouts and outputs the sensing result to the area division unit 106.

The area division unit 106 divides the screen area of the touch screen into zones corresponding to the layout sensed by the layout sensing unit 104. For example, if the user selects the area division illustrated in FIG. 2A, the area division unit 106 divides the touch screen as illustrated in FIG. 2A.

The allocation unit 110 allocates the first through nth user interface units 120, 130, and 140 to corresponding zones of the touch screen and outputs the division result to the first through nth user interface units 120, 130, and 140.

For example, if the touch screen division unit 100 has divided the screen area of the touch screen into two zones as illustrated in FIG. 2A, the allocation unit 110 allocates the first user interface unit 120 to a zone A and outputs the allocation result to the first user interface unit 120. The allocation unit 110 also allocates the second user interface unit 130 to a zone B and outputs the allocation result to the second user interface unit 130.

Each of the first through nth user interface units 120, 130, and 140 displays a user interface corresponding to each of the zones according to the allocation result.

Figure 3:
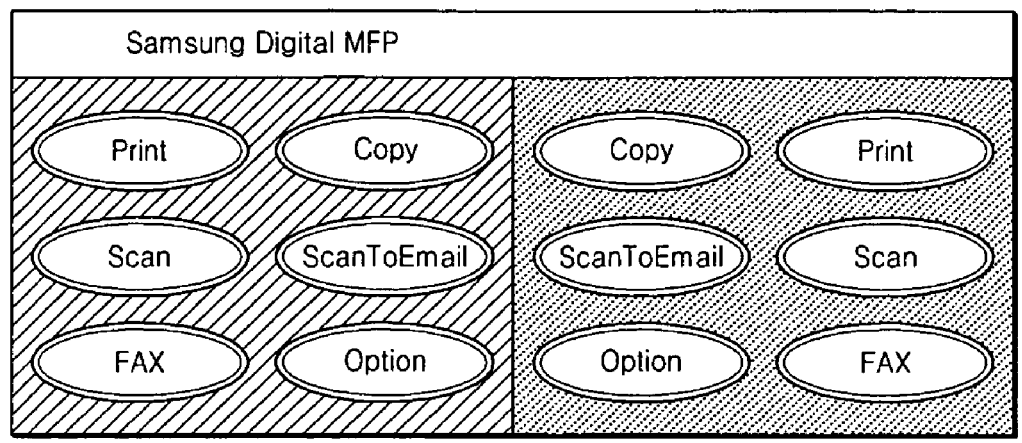
FIG. 3 illustrates user interfaces of the exemplary touch screen of FIG. 2 divided into two zones.

FIG. 3 illustrates user interfaces of the touch screen divided into two zones.

For example, if the allocation unit 110 allocates that the first user interface unit 120 is allocated to the divided zone A of FIG. 2A, the first user interface unit 120 displays a user interface on the divided zone A as illustrated in FIG. 3. If the allocation unit 110 allocates that the second user interface unit 130 is allocated to the divided zone B of FIG. 2A, the second user interface unit 130 displays a user interface on the divided zone B as further illustrated in FIG. 3.

Each of the first through nth user interface units 120, 130, and 140 senses a job command input through each of the zones.

For example, when a user selects any of a printing job, a copy job, a scanning job, a fax job and the like through the user interface allocated to the divided zone A, the first user interface unit 120 senses the job command selected by the user. Moreover, the second through nth user interface units 130 and 140 also sense the job command selected by the user. When another user selects any one of a printing job, a copy job, a scanning job, a fax job and the like through the user interface of the divided zone B, the second user interface unit 130 senses that job command selected by the user. Similarly, the first and nth user interface units 120 and 140 also sense the job command selected by the another user.

When a new job (for example, Scan, Fax, or Print) is registered for a device that is currently being used for a proceeding job previously input from among the displayed user interfaces, the first through nth user interface units 120, 130, and 140 may inactivate input buttons of jobs that are typically performed immediately. The buttons that are inactivated are returned to active when the device is ready for use after the registered job is complete. In addition, the first through nth user interface units 120, 130, and 140 may activate input buttons, except buttons associated with the currently proceeding job, among the displayed user interfaces.

A new job can be registered during printing, and the registered job is performed as soon as a previous job ends. However, for scanning, a new scanning job may not be registered while the device is scanning. For example, while a document for copy is being scanned, input buttons "Copy," "Scan," and "ScanToEmail" are inactivated. When the scanning of the document for copy ends, input buttons not overlapping with a currently proceeding job are activated. For faxing, a new job may or may not be registered according to the type of a currently proceeding job.

Figure 4:
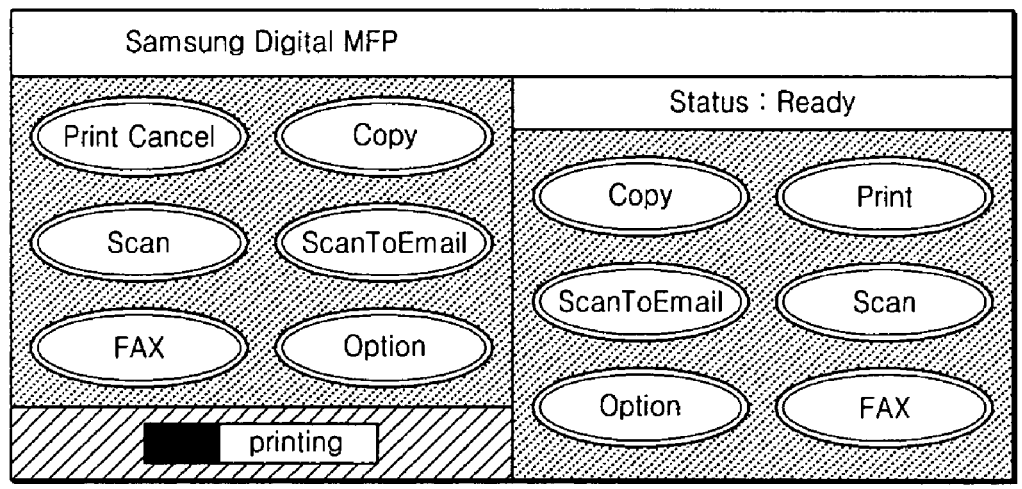
FIG. 4 illustrates a user interface displaying a job execution process for the exemplary touch screen of FIG. 3 divided into two zones.

FIG. 4 illustrates the divided touch screen of FIG. 3 when a user interface displays a job execution process. If a user selects a printing job command through the user interface displayed on the divided zone A of FIG. 3, an image indicating that a printing job is proceeding may be displayed on the divided zone A as illustrated in FIG. 4.

The user interface units 120, 130, and 140 of the touch screen described above may be included in an MFP. The MFP includes a printing device, a copy device, a scanning device, a facsimile and the like.

A user interface method of a touch screen according to an exemplary embodiment of the present invention will now be described in detail with reference to the accompanying drawings.

Figure 5:
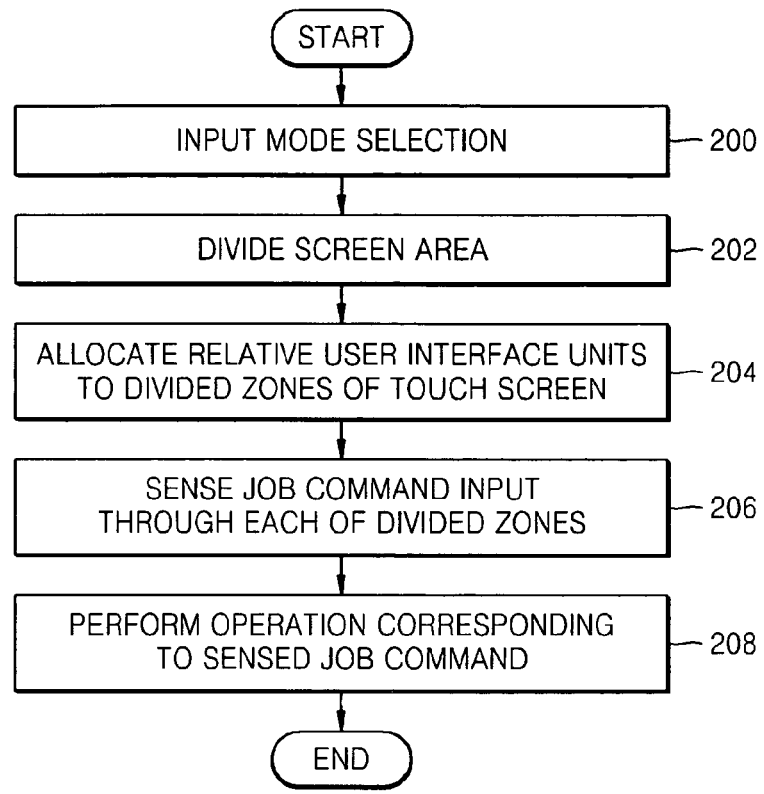
FIG. 5 is a flowchart illustrating a user interface method of a touch screen according to an exemplary embodiment of the present invention.

FIG. 5 is a flowchart illustrating a user interface method of a touch screen according to an exemplary embodiment of the present invention.

Referring to FIG. 5, a mode selection for area division of the touch screen is input in operation 200. The mode selection can be input when an image-forming device is in an idle state or is performing a job, such as printing or copying.

A screen area of the touch screen is divided in operation 202.

Figure 6:
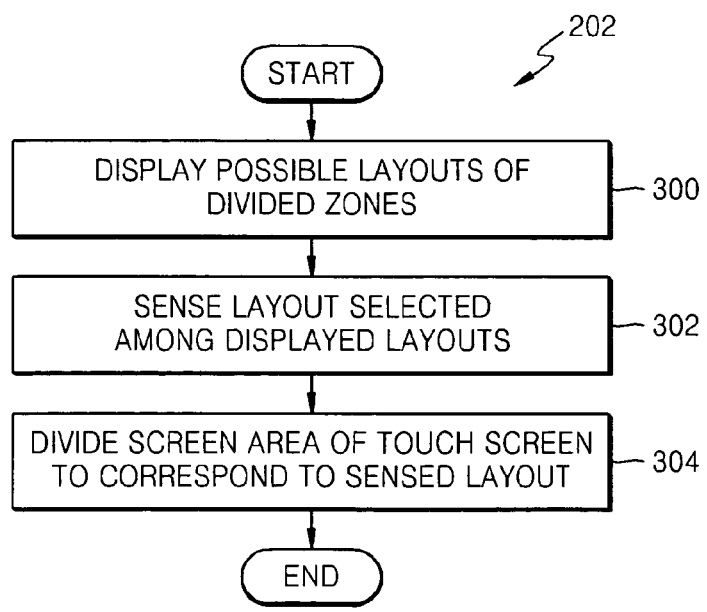
FIG. 6 is a detailed flowchart illustrating an operation of FIG. 5 according to an exemplary embodiment of the present invention.

FIG. 6 is a detailed flowchart illustrating operation 202 of FIG. 5 according to an exemplary embodiment of the present invention.

Possible layouts of the zones of the touch screen are displayed in operation 300. Each of the layouts of the touch screen may be obtained by dividing the touch screen into at least two zones. As illustrated in FIGS. 2A through 2D, various layouts can be displayed.

A layout selected by a user among the displayed layouts is sensed in operation 302.

The screen area of the touch screen is divided to correspond to the sensed layout in operation 304.

A relative number of user interface units are allocated to the zones in operation 204. For example, if the touch screen is divided into two zones in operation 202 as illustrated in FIG. 2A, the first user interface unit 120 is allocated to zone A and the second user interface unit 130 is allocated to zone B.

In operation 206, user interfaces corresponding to the zones are displayed, and job commands input through the user interfaces of the zones are sensed.

For example, if the first user interface unit 120 is allocated to the divided zone A of FIG. 2A, the first user interface unit 120 displays a user interface on the divided zone A as illustrated in FIG. 3. If the second user interface unit 130 is allocated to the divided zone B of FIG. 2A, the second user interface unit 130 displays a user interface on the divided zone B as illustrated in FIG. 3. In particular, when a new job (for example Scan, Fax, or Print) is registered for a device currently being used for a proceeding job previously input from among the displayed user interfaces, the first and second user interface units 120 and 130 may inactivate input buttons of jobs that are typically performed immediately. The buttons that are inactivated are returned to active when the device is ready for use after the registered job is complete. In addition, input buttons, except buttons associated with the currently proceeding job among the displayed user interfaces may be activated.

Each of the user interface units corresponding to the zones senses that a job command is input through a relative user interface.

For example, when a user selects any one of a printing job, a copy job, a scanning job, a fax job and the like through the user interface of the divided zone A illustrated in FIG. 3, the first user interface unit 120 senses a job command selected by the user. Moreover, the second through nth user interface units 130 and 140 also sense the job command selected by the user. When another user selects any one of a printing job, a copy job, a scanning job, a fax job and the like through the user interface of the divided zone B illustrated in FIG. 3, the second user interface unit 130 senses a job command selected by the user. Similarly, the first and nth user interface units 120 and 140 also sense the job command selected by the another user.

An operation corresponding to the sensed job command is performed in operation 208. For example, if the sensed job command is a printing job, a printing job is performed.

The user interface method of a touch screen described above may comprise a MFP including a printing device, a copy device, a scanning device, a facsimile and the like.

The exemplary embodiments of the present invention can be written as codes/instructions/programs and can be implemented in general-use digital computers that execute the codes/instructions/programs using a computer readable recording medium.

Examples of the computer readable recording medium include magnetic storage media (for example, ROM, floppy disks, hard disks, etc.), optical recording media (for example, CD-ROMs, or DVDs), and storage media such as carrier waves (for example, transmission through the Internet). The computer readable recording medium can also be distributed over network coupled computer systems so that the computer readable code is stored and executed in a distributed fashion.

Also, functional programs, codes, and code segments for accomplishing the exemplary embodiments of the present invention can be easily construed by programmers skilled in the art to which the present invention pertains.

As described above, using a user interface apparatus and method of a touch screen according to exemplary embodiments of the present invention, a plurality of users can simultaneously use an image-forming device, and thus, job processing time can be reduced, and other users do not have to wait to use the image-forming device.

In addition, when a single user simultaneously performs a plurality of jobs, different jobs can be processed in parallel, increasing job efficiency.

In addition, since a plurality of users can simultaneously use a high specification image-forming device, a usage rate of the image-forming device can be increased.

While the present invention has been particularly shown and described with reference to exemplary embodiments thereof, it will be understood by those of ordinary skill in the art that various changes in form and details may be made therein without departing from the spirit and scope of the present invention as defined by the following claims and the full scope of equivalents thereof.

What is claimed is:

1. A user interface apparatus for a touch screen of a multi-function peripheral (MFP), the multi-function peripheral has at least two of a printing unit, a scanning unit, a copy unit and a facsimile unit, the user interface apparatus comprising:
   a mode selection input unit for receiving a selection regarding whether to enable a screen area division function which divides a screen area of the touch screen into a plurality of zones, the plurality of zones have input buttons for inputting job commands, the plurality of zones are functionally identical and logically separated each other such that the job commands are to be inputted to the plurality of zones separately and independently;
   a touch screen division unit for dividing the screen area of the touch screen into the plurality of zones, if the screen area division function is enabled by the received selection; and
   an allocation unit for allocating a plurality of user interface units to each of the plurality of zones, respectively, the plurality of user interface units inactivate a specific input button from among the job buttons of the plurality of zones while a job corresponding to the specific input button is being performed.

2. The apparatus of claim 1, wherein the mode selection input unit inputs the selection while a job is performed.

3. The apparatus of claim 1, wherein the touch screen division unit comprises:
   a layout display unit for displaying layouts of the touch screen;
   a layout sensing unit for sensing a selected layout among the displayed layouts; and
   an area division unit for dividing the screen area of the touch screen to correspond to the sensed selected layout.

4. The apparatus of claim 3, wherein the layouts of the touch screen are obtained by dividing the screen area of the touch screen into at least two zones.

5. The apparatus of claim 3, wherein the plurality of user interface units display user interfaces according to the selected layout.

6. The apparatus of claim 3, wherein the plurality of user interface units comprise input buttons for controlling the job commands.

7. The apparatus of claim 6, wherein the plurality of user interface units inactivate input buttons corresponding to job commands that are typically performed immediately until a device currently being used for a proceeding job can be used for a new job, after the new job is registered for the device.

8. The apparatus of claim 6, wherein the plurality of user interface units activate input buttons corresponding to job commands except input buttons associated with a currently proceeding job, among the displayed user interfaces.

9. A user interface apparatus of a touch screen of a multi-function peripheral (MFP), the multi-function peripheral has at least two of a printing unit, a scanning unit, a copy unit and a facsimile unit,
wherein the screen area of the touch screen is divided according to a screen area division function which divides the screen area into a plurality of zones having input buttons for inputting job commands, the plurality of zones are functionally identical and logically separated each other such that the job commands are to be inputted to the plurality of zones separately and independently, and a relative number of user interface units are allocated to the zones,
wherein the user interface units inactivate a specific input button from among the job buttons of the plurality of zones while a job corresponding to the specific input button is being performed.

10. A method of using a touch screen of a multi-function peripheral (MFP), the multi-function peripheral has at least two of a printing unit, a scanning unit, a copy unit and a facsimile unit, the method comprising the steps of:
receiving a selection regarding whether to enable a screen area division function which divides a screen area of the touch screen into a plurality of zones, the plurality of zones have input buttons for inputting job commands, the plurality of zones are functionally identical and logically separated each other such that the job commands are to be inputted to the plurality of zones separately and independently;
dividing the screen area of the touch screen into the plurality of zones, if the screen area division function is enabled by the received selection;
allocating a plurality of user interface units to each of the plurality of zones respectively;
sensing job commands input through the plurality of zones;
performing an job corresponding to each of the sensed job commands; and
inactivating a specific input button from among the job buttons of the plurality of zones while the job is being performed.

11. The method of claim 10, wherein, inputting a mode selection comprises inputting a mode selection while a job is performed.

12. The method of claim 10, wherein, inputting a mode selection comprises inputting a mode selection while a device is idle.

13. The method of claim 10, wherein dividing a screen area of the touch screen comprises:
displaying layouts of the touch screen;
sensing a selected layout among the displayed layouts; and
dividing the screen area of the touch screen to correspond to the sensed selected layout.

14. The method of claim 13, wherein the layouts of the touch screen are obtained by dividing the touch screen into at least two zones.

15. The method of claim 13, wherein sensing job commands input through the zones comprises displaying user interfaces according to the selected layout.

16. The method of claim 15, wherein sensing job commands input through the zones comprises inactivating input buttons corresponding to jobs that are typically performed immediately until a device currently being used for a proceeding job can be used, after a new job is registered for the device.

17. The method of claim 15, wherein, sensing job commands input through the zones comprises activating input buttons corresponding to job commands except input buttons associated with a currently proceeding job, among the displayed user interfaces.

18. A user interface apparatus for a touch screen of a multi-function peripheral (MFP), the multi-function peripheral has at least two of a printing unit, a scanning unit, a copy unit and a facsimile unit, the user interface apparatus comprising:
a mode selection input unit for receiving a selection regarding whether to enable a screen area division function which divides a screen area of the touch screen into a plurality of zones, the plurality of zones have input buttons for inputting job commands, the plurality of zones are functionally identical and logically separated each other such that the job commands are to be inputted to the plurality of zones separately and independently;
a touch screen division unit for dividing the screen area of the touch screen into the plurality of zones, if the screen area division function is enabled by the received selection;
wherein each of the plurality zones senses job commands input by a user and an job corresponding to each of the sensed job commands is performed,
wherein a specific input button corresponding to the job from among the input buttons of the plurality of zones is inactivated while the job is being performed.

\* \* \* \* \*